United States Patent [19]

Lutz

[11] 3,730,973

[45] May 1, 1973

[54] TELEPRINTER SUBSCRIBER SET HAVING A REMOTE SWITCHING GROUP FOR GALVANIC DECOUPLING FROM THE CONNECTING LINE AND A CIRCUIT ARRANGEMENT FOR ENABLING LOCAL OPERATION

[75] Inventor: Roman Lutz, Munich, Germany

[73] Assignee: Siemens Aktiengesellschaft, Berlin and Munich, Germany

[22] Filed: June 11, 1971

[21] Appl. No.: 152,053

[30] Foreign Application Priority Data

Aug. 12, 1970 Germany....................P 20 40 161.0

[52] U.S. Cl. ..................................................178/2 R
[51] Int. Cl. ..............................................H04l 13/00
[58] Field of Search ...........................178/2 R, 69 R; 317/33 R

[56] References Cited

UNITED STATES PATENTS

| | | | |
|---|---|---|---|
| 3,585,453 | 6/1971 | Kawai | 317/33 R |
| 3,599,042 | 8/1971 | Andrews, Jr. | 317/33 R |
| 3,654,518 | 4/1972 | Phelps et al. | 317/33 R |
| 3,581,075 | 5/1971 | Mattson et al. | 178/69 R |

*Primary Examiner*—Thomas W. Brown
*Attorney*—Hill, Sherman, Meroni, Gross & Simpson

[57] ABSTRACT

A Telex subscriber set includes a plug control circuit for preventing destruction of the electronic input relays of a remote control switching group due to inadvertent short circuits arising in manipulation of the connecting plug.

3 Claims, 3 Drawing Figures

Patented May 1, 1973

3,730,973

2 Sheets-Sheet 1

INVENTOR
Roman Lutz

BY: Hill, Sherman, Meroni, Gross & Simpson

ATTYS.

INVENTOR
Roman Lutz

BY: Hill, Sherman, Meroni, Gross & Simpson

ATTYS.

TELEPRINTER SUBSCRIBER SET HAVING A REMOTE SWITCHING GROUP FOR GALVANIC DECOUPLING FROM THE CONNECTING LINE AND A CIRCUIT ARRANGEMENT FOR ENABLING LOCAL OPERATION

This invention relates to Telex subscriber sets and is more particularly concerned with apparatus for preventing the destruction of electronic input relays of remote control switching groups due to inadvertent short circuits which may arise at the telegraphy plug.

It is common practice in Telex networks to provide apparatus for producing a punched tape and/or examining a finished punched tape by way of the Telex line when the Telex machine is at rest but conditioned to a "local operation" mode. Therefore, subscriber sets which are included in the public Telex network as a rule have priority with respect to local operation. Local operation is effected through the means of a telegraphy plug which is pulled out to effect a disconnection in a bridge circuit in the connection box.

It is also common practice in the use of Telex machines having electronic remote control switching groups to galvanically decouple the connecting wires from the circuit of the machine. In such arrangements, it is clearly evident that if the control circuit which interrupts the local operation upon removal of the telegraphy plug would be realized by a low-ohmic loop from the operational ground out of the machine to the bridge circuit in the connection box and back to the remote control group, a short circuit might arise due to an inadvertent exchange of the connecting wire upon initiation of operation due to the operational ground at the telegraphy plug. Such a condition is, of course, highly disadvantageous in that it might lead to destruction of the electronic input relays of the remote control switching group.

The primary object of the present invention is, therefore, to provide a Telex control with an improved plug control loop generally of the type mentioned above in which destruction of the electronic input circuits is avoided even in the presence of erroneous potential applications at the terminals or undesired short circuits at the connection point. If, for example, the plug socket and the operational ground line are connected by way of a small resistance, the line balancing resistor will be ineffective and approximately half of the telegraphy voltage is applied directly to the input terminals of the device. The current is therefore limited only by the line resistance and the input resistance and can assume values which cause destruction of the electronic input and output switches. This is prevented according to the present invention, through the provision of an electronic control circuit for interrupting the local operation when the telegraphy plug is pulled out including a transistor whose base contact and current supply is connected to the plug sockets which are to be bridged, by way of a high value resistor, and a point of the line intersection which is connected with the base of the transistor is connected with one of the plug sockets by way of a high value resistor and is connected to the supply potential by way of a diode poled in a current blockage direction, and also connected to ground potential by way of a second diode.

In a preferred embodiment of the invention, a transistor of the PNP type is provided whose emitter is connected with the internal supply potential while its collector is connected to ground potential by way of a high value resistor.

The above and other objects, features and advantages of the invention will become apparent from the following detailed description of exemplary embodiments thereof taken in conjunction with the accompanying drawings, in which.

Figures 1, 3:
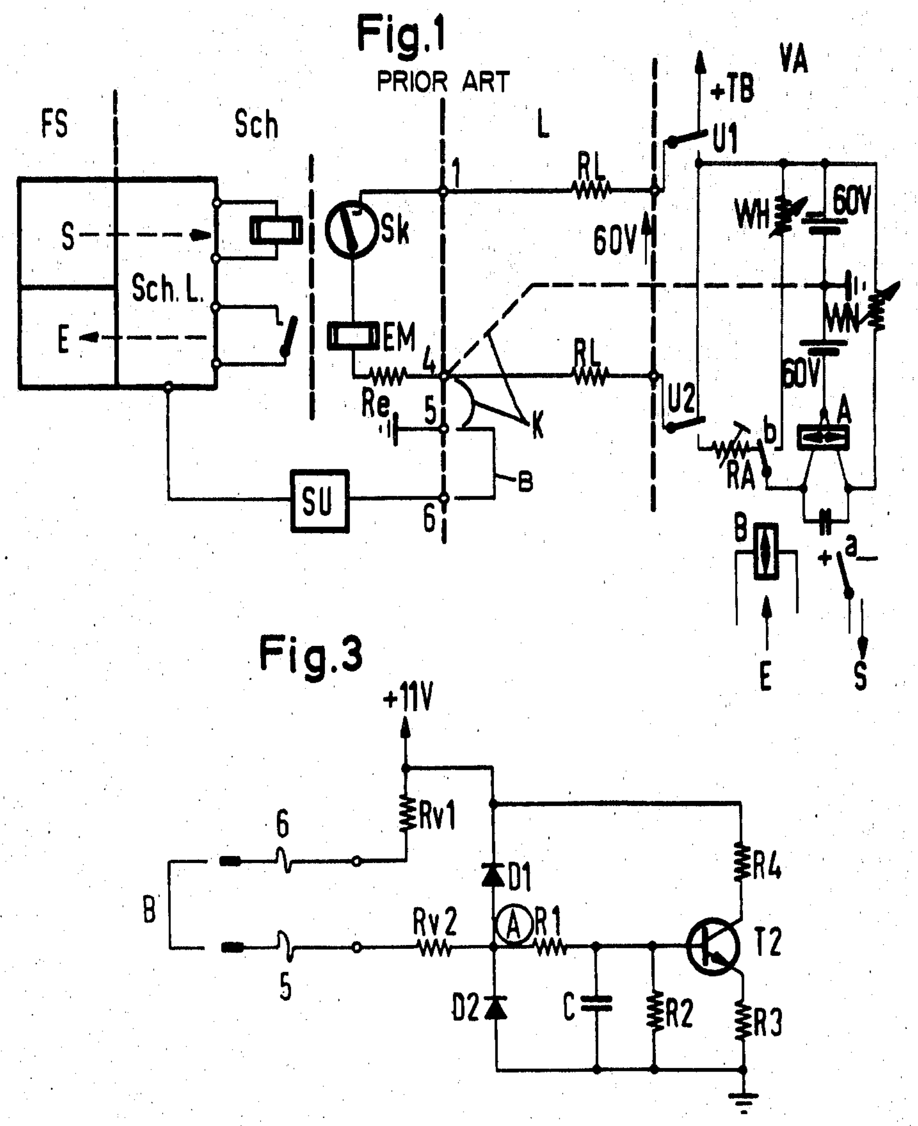
Fig.1, Fig.3 PRIOR ART
FIG. 1 is a schematic circuit diagram illustrating a principle of a Telex control having supply lines to the central office including a telegraph battery and including indications of cases of short circuits which arise during the application of a plug control circuit of low resistance.
FIG. 3 is a circuit diagram of a variation of the plug control circuit illustrated in FIG. 2.

In FIG. 1, a central office VA includes two 60-volt direct current supply devices which are connected with ground potential at a center point between the wires a and b and with contact points 1 and 4 of a subscriber. Associated with the subscriber is a remote control switching group Sch, a transmission contact Sk, a receiver magnet EM and a resistor Re. In addition, as is common in prior art arrangements, a contact point 5 is provided and connected to ground potential and a plug control circuit SU is connected with a contact point 6, and means are provided for an automatic bridging of the contact points 5 and 6 at a bridge B when the telegraphy plug is pulled out. Undesired short circuits at the points K, or an inadvertent exchange of contact wires can cause a destruction of the electronic input relays in the remote control switching group Sch when the plug is manipulated, the plug here being indicated by the heavy broken line through the points 5 and 6.

Figure 2:
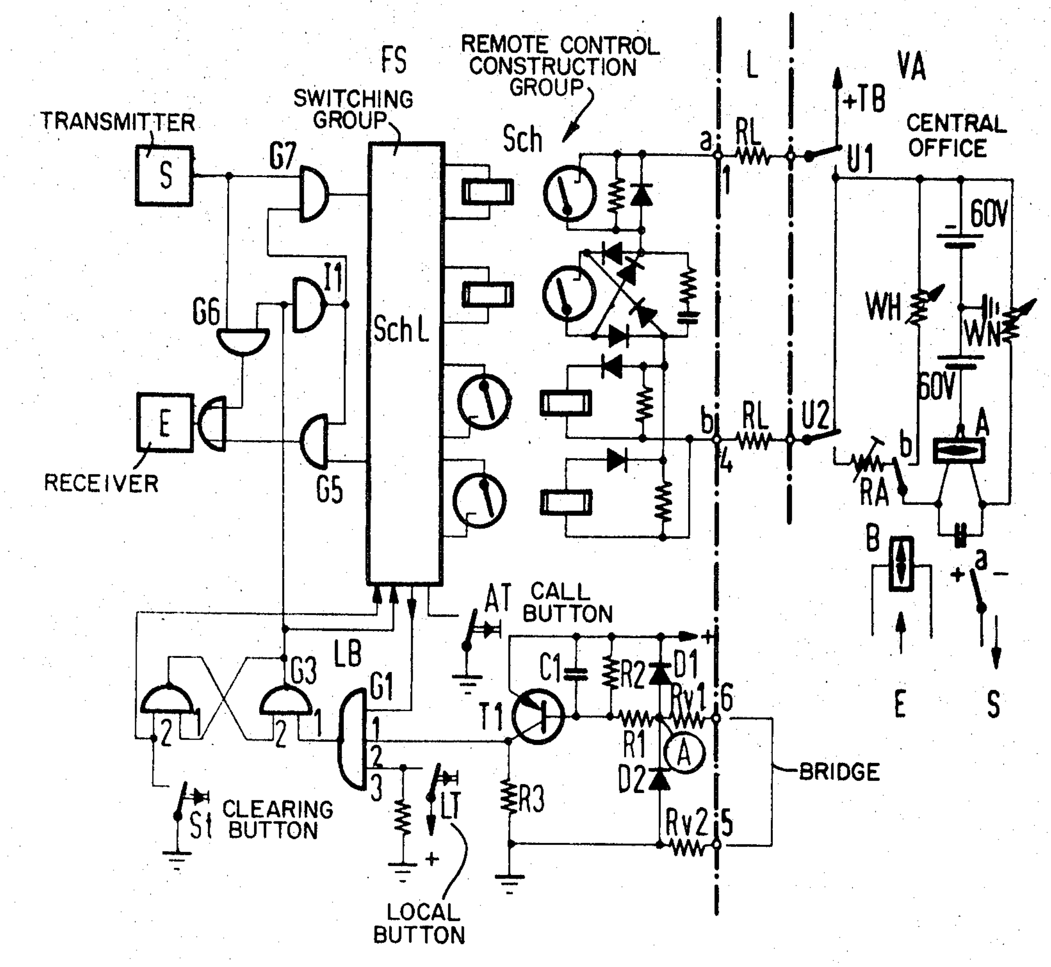
FIG. 2 is a detailed schematic circuit diagram in accordance with the principle of a Telex subscriber set having a plug control circuit according to the present invention.

The disadvantages of the foregoing circuits are avoided when the plug control circuit according to FIGS. 2 and 3 are provided. These circuits differ from each other in their kind of control; however, both circuits have input resistances Rv1 and Rv2 of, for example, 10K per wire with respect to ground which limit the current to a harmless value during possible short circuits.

With the plug control circuit according to FIG. 2, no coupling of the contact point 6 is effected with the internal current supply. A transistor T1 which is provided in the circuit is a PNP type with which, as it is known, it is possible to control the base thereof by way of high value resistors in accordance with the principles for a grounded collector transistor circuit configuration. The type of construction of the remote control construction group Sch associated with the subscriber set corresponds in principle to circuits known in the prior art, such as that disclosed in the German published Pat. No. 1,537,353. On one hand, they are connected with the Telex lines L with the wires *a* and *b*, and on the other hand, with a transmitter S and a receiver E by way of a gate circuit for the local switching operation, as well as the functional push button control switches LT (local button), St (clearing button), and AT (call button). The bridge circuit in the Telex plug at points 5, 6 permits local operation by way of an AND circuit G1 when the remote control logic switching group Sch and L basically releases this operation. G1-1 is at "1". Then the input G1-2 is "1" and the transistor T1 is conductive. By means of depressing the button LT, the input G1-3 also becomes "1" and thus the input G3-1 will become "0" and the output of the gate G3 will become "1". The transmitter S and the receiver E are therefore locally connected by way of the further gate G6 and the remaining gates G7 and G5 are blocked by the "0" at the output of an inverter I1. The state or mode "local operation" is signaled to the remote control logical switching group Sch L by way of a line LB. A pair of diodes D1 and D2 retain a point A at 0 or +5 volts, which point is connected to the base of the transistor T1 by way of a resistor R1 of, for example, 1.8 K, depending on the polarity of the interfering voltage at the contact point 6, so that a current of no more than 2.5 mA, for example, can flow in the base path of the transistor T1. Since with telegraphy lines voltages of more than ± 80 V should not be taken into account, the transistor T1 is protected sufficiently with a resistance of 10 KΩ(1 W).

In the circuit arrangement according to FIG. 3, an NPN transistor T2 is triggered to be conductive by way of two resistors Rv1 and Rv2 which are connected to a voltage source, such as 11 V. The values for the remaining circuit components which may be advantageously utilized are:

Capacitor C — 1 μF
Resistor R1 — 1.8 KΩ
Resistor R2 — 10 KΩ
Resistor R3 — 2.2 KΩ
Resistor R4 — 2.2 KΩ

If a potential of +60 V is applied to the connection point 5 or the connection point 6, a maximum current of 6 mA will flow, which current is ineffective to cause destruction of the electronic circuits.

A further increase of the voltage only increases the drop across the resistors. The transistor T2 in FIG. 3 is protected by way of the diodes D1, D2. Approximately 7 mA flows at the application of −60 V, at the contact point 6; the same voltage at the contact point 5 only effects an additional blocking voltage to the transistor and is therefore without effect thereon.

Although I disclosed my invention by reference to specific illustrative circuits, many changes and modifications thereof will become apparent to those skilled in the art without departing from the spirit and scope of my invention, and it is to be understood that I intend to include within the patent warranted hereon all such changes and modifications as may reasonably and properly be included within the scope of my contribution to the art.

What I claim is:

1. A Telex subscriber set having an electronic remote control switching group which is galvanically decoupled from the line and a switching arrangement which enables local operation, an electronic control circuit for enabling local operation when a telegraphy plug having a pair of terminals is disengaged from the subscriber set, said electronic control circuit comprising:

a transistor having a base, an emitter and a collector, said emitter connected to an electrical potential;

first and second current limiting resistors, said first resistor connected between one of said terminals and said base and said second resistor connected between the other of said terminals and ground;

a third resistor serially interposed between said first resistor and said base to define a junction point between said first and third resistors;

a first diode connected between an electrical supply and said junction point and poled in a current blocking direction;

a second diode connected between said junction point and ground and poled in a current blocking direction; and means for engaging and disengaging an electrical connection between the terminals of said plug whereby the operational current for the base of said transistor is selectively controlled.

2. An electronic circuit according to claim 1, wherein said transistor is an NPN transistor and including a fourth current limiting resistor connected between said emitter and ground and a fifth resistor connected between said collector and the electrical supply.

3. An electronic control circuit according to claim 1, wherein said transistor is a PNP transistor and comprising a fourth current limiting resistor connected between said collector and ground.

* * * * *